United States Patent

[11] 3,529,558

[72] Inventor Richard Tanner
 Zurich, Switzerland
[21] Appl. No. 778,061
[22] Filed Nov. 22, 1968
[45] Patented Sept. 22, 1970
[73] Assignee Von Roll AG, Gerlafingen
 Switzerland
 a corporation of Switzerland
[32] Priority July 15, 1968
[33] Switzerland
[31] No. 10525/68

[54] PROCESS AND MECHANICAL EQUIPMENT FOR THE CONCOMITANT INCINERATION OF SOLID REFUSE AND AQUEOUS SEWAGE SLUDGE
5 Claims, 1 Drawing Fig.

[52] U.S. Cl. .................................................. 110/8, 110/15
[51] Int. Cl. ................................................... F23g 5/04
[50] Field of Search ........................................ 110/7, 8, 10, 15

[56] References Cited
UNITED STATES PATENTS
1,892,681 1/1933 Rankin .......................... 110/8UX
3,319,586 5/1967 Albertson et al. ............. 110/8
FOREIGN PATENTS
1,010,377 11/1965 Great Britain ................. 110/8

Primary Examiner—Kenneth W. Sprague
Attorney—Werner W. Kleeman

ABSTRACT: A novel process is disclosed for the concomitant incineration of solid refuse and aqueous sewage sludge. The solid refuse is burnt in a conventional incinerator whereas the aqueous sewage sludge undergoes a partial thermal dewatering by partially vaporizing the sludge water in a pressurized vaporizer. The vaporizer is heated by hot combustion gases effluent from the incinerator. The resulting sludge slurry is thereupon introduced in an atomized state into the combustion chamber of the incinerator or, alternatively, undergoes a further mechanical dewatering step to be brought into a semi-solid consistency and is then added to and mixed with the solid refuse prior to its incineration to be burnt together. A novel apparatus for carrying out the inventive process is also disclosed in schematic format.

Patented Sept. 22, 1970
3,529,558
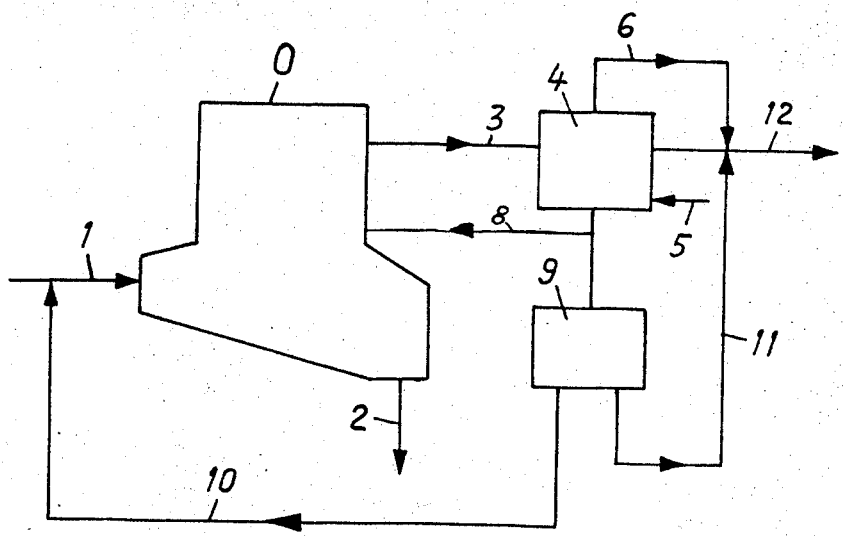
INVENTOR
RICHARD TANNER
BY Jacobi & Davidson
ATTORNEY

PROCESS AND MECHANICAL EQUIPMENT FOR THE CONCOMITANT INCINERATION OF SOLID REFUSE AND AQUEOUS SEWAGE SLUDGE

BACKGROUND OF THE INVENTION

One of the problems of modern day living in the civilized countries concerns the disposal of the great and steadily increasing amount of refuse of differing varieties. Such refuse comprises household garbage, street sweepings, packaging paper and cardboard, wood, plastics and rubber, garden foliage, junk and rubbish, refuse from workshops and the like and, furthermore, putrid and malodorous sludge from community sewage treatment plants. For obvious social hygienic and esthetic reasons, all of this unpleasant refuse must be disposed of. Dumping or land-fill operations to this effect are not entirely suitable due to the danger of air and ground water pollution thereby entailed and further due to the gradual decrease to be expected in the amount of available open land. Thus, the solution to the refuse problem appears to lie in the total distruction of the noxious materials.

In this regard, various processes have been devised and are practiced, among which incineration of the refuse has proved to be the most suitable from a hygienic as well as from an economic standpoint. However, whereas for the incineration of solid refuse, a variety of proven processes and plants have been developed and are presently available, no such process has yet been fully satisfactory in the destruction of sewage sludge. This is due mainly to the fact that, in its initial state, sewage sludge is a very aqueous suspension of both solid and putrid matter. Before a combustion of the putrid matter or, more precisely, of the organic and combustible materials therein contained may take place, the sewage sludge has to be dewatered to complete dryness. Dewatering processes of various types have again been devised in the prior art, such processes using mechanical, thermal, and chemical means. Such processes, however, are quite costly from either or both the initial cost and operational cost standpoints.

In circumstances wherein both solid refuse and sewage sludge may be or may have to be incinerated on the same site, an obvious and advantageous technique is to utilize the heat of combustion from the incineration of the solid refuse for the thermal dewatering of the sewage sludge by vaporizing the water therein contained.

In this regard, it would be helpful to technically analyze the various heating parameters relevant to the combustion of solid refuse and/or sewage sludge. Thus, in the following, the so-called equivalent amounts of solid refuse and sewage sludge will be taken into consideration, i.e. the amounts of both refuse types resulting from the same number of inhabitants during the same period of time. Furthermore, and with respect to sewage sludge, an initial water content of 92 percent will be assumed as is most generally the case with discharge from thickeners utilized in modern sewage treatement plants. The figures given hereinbelow for these amounts are pertinent not only as to present conditions but also have been projected for the near furture.

The amount of solid refuse per inhabitant per day (per caput et dies) = (pcd) is between 0.7 and 2.0 kg, the calorific value ranging from 1000 to 2000 kcal/kg. The heat of combustion therefore comes to 700 to 5000 kcal pcd. However, only some 500 to 3000 kcal pcd of this heat is available for use since, for reasons well known in the art, the exhaust temperature of the flue gases must be kept above some 300°C.

The amount of sewage sludge having 92 percent water content as discussed above, is of some 1 to 2 kg pcd. Bearing the figure of 700 kcal/kg in mind as the heat for the vaporization of 1 kg of water and the subsequent superheating of the resulting vapor to the above-mentioned temperature of 300°C., the amount of heat necessary for drying the equivalent quantity of sewage sludge comes to 650 to 1300 kcal pcd, which amount may be reduced to only 500 to 1150 kcal pcd when taking into account the calorific value of the dried sludge which is to be burnt together with the solid refuse.

The calculations given above clearly show that from a mixture of solid refuse and liquid sewage sludge, if such a mixture were at all possible and feasible under operational conditions, would result in a fuel of very low calorific value which would scarcely be capable of self-supporting combustion and which, in any case, would attain combustion temperatures so low that unpleasant odors would persist contrary to the primary requirement of hygienic incineration and the prevention of air pollution.

On the other hand, the calculations given above indicate that the available heat of combustion from the solid refuse is sufficient to dry an equivalent amount of sewage sludge, although in extreme cases additional fuel, such as oil, may be needed. Such cases may occur with solid refuse that is extremely wet or when the solid refuse is in short supply such as would be the case during week-ends.

With the above discussion in mind, it appears obvious to separate the dewatering of the sewage sludge from the incineration of the solid refuse by carrying out the dewatering as thermal drying at some location in the current of the hot flue gases effluent from the combustion chamber for the solid refuse, downstream of the chamber, so as to therein maintain optimum conditions for the incineration of the solid refuse.

To this effect, the coupling or connection of an incinerator for solid refuse with an incinerator for sewage sludge has previously been suggested, the incinerator for sewage sludge preferably being a furnace of the multi-stage type with the hot combustion gases effluent from the incinerator for solid refuse operating as an intermediate thermal agent effective to carry heat into the multi-stage furnace for the sewage sludge.

A further suggestion concerns the connection of two separate incinerating stations within a single unit, the incinerating stations preferably being of the grate-equipped type. One of the incinerating stations would be provided for the solid refuse and the other incinerating station would be provided for the sewage sludge with the incinerating station for the sewage sludge being located downstream of the solid refuse station in the current of hot combustion gases.

A still further proposal concerns the utilization of a heat exchanger of the type utilizing solid and minute carrier substances in a recirculating fashion, the carrier substance being heated in a first location by the hot flue gases effluent from the incinerator for solid refuse and subsequently yielding its heat at a second station for the drying of the sewage sludge which would be sprayed upon the carrier substance.

A still further suggestion in the prior-art concerns the provision of a cooling tower disposed downstream of the incinerator for solid refuse, with the liquid sewage sludge being sprayed into the cooling tower to therein vaporize in contact with the hot flue gases from the incinerator.

All the prior-art proposals mentioned above have one feature in common, this feature concerning the fact that each effects total pre-drying of the sewage sludge by vaporizing all of its initial water content. The equipment utilized in these prior-art processes and techniques is quite elaborate and of comparatively high cost when one considers the necessity of providing multi-stage furnaces, separate incinerating stations, heat exchangers, cooling towers and the like. Further, the dried sludge has to subsequently be returned into the incinerator for the solid refuse wherein it is burnt.

THE INVENTIVE PROCESS

In direct contrast to the processes proposed in the prior-art discussed above, and consistent with the objective of hygienically and economically disposing of accumulated waste, the instant inventive process disclosed herein effects the thermal pre-drying of the liquid sludge in two phases. In the first phase, a thermal thickening of the sewage sludge into a still liquid slurry is carried out in a convenient vaporizer and under pressure, the vaporizer being heated by hot combustion gases effluent from the incinerator for solid refuse. The resulting slurry is drained from the vaporizer either continuously or discontinuously and is subsequently pumped and sprayed, by means of suitable nozzles, into the combustion chamber of the incinerator for solid refuse. Optimum results may be obtained wherein approximately 50 percent of the initial sludge water is vaporized in the first or thickening phase, the resulting slurry thereby having a water content of approximately 85 percent and thereby being suitable for atomization by the nozzles utilized.

The thickening vaporization carried out in the first stage of the inventive process may be effected at any pressure and corresponding temperature. At a suitable and convenient pressure having a boiling temperature of at least 150°C. associated therewith, a thermal-physical change of the solid substances in the sludge, commonly known as "conditioning" may occur concomitantly with the partial vaporization of the sludge water. This enables further mechanical dewatering of the slurry to be carried out through such operations as press-filtration, centrifuging, and the like. The slurry is then brought into a pasty half-dried condition in which it is possible to directly add and blend the slurry with the solid refuse. The separated liquid generally contains much noxious material and therefore is pumped and sprayed into the combustion chamber of the incinerator for the solid refuse wherein the separated liquid or water is vaporized and the noxious substances therein are destroyed. The actual combustion of the solid substances contained in the sewage sludge, or more precisely, the actual combustion of the combustible material therein, is effected in the incinerator for solid refuse together with the incineration of the solid refuse itself.

The subject inventive process will be better understood when consideration is given to a quantitative analysis of the interrelation of the waste material and heat requirements involved. For this analysis and for purposes of simplification, 1 kg of solid refuse and 1 kg of sewage sludge having a 92 percent water content will be assumed as equivalent quantities pcd, as defined above.

Solid refuse contains some 40 percent combustible matter together with some 30 percent mineral and metallic non-combustible substances and 30 percent water or humidity. With respect to the combustible matter, a calorific value of some 4000 kcal/kg may be assumed as an average, giving an overall calorific value of some 1400 kcal/kg for the solid refuse.

Sewage sludge having a 92 percent water content, of course, contains about eight percent solid substances. About half of the solid substances comprise combustible matter for which, when considering the less favorable presence of digested sludge, a calorific value of some 4000 kcal/kg may be assumed.

After vaporization of 50 percent of the sludge water and without any further intermediate dewatering of the slurry, the amount of combustible matter introduced into the incinerator in accordance with the inventive process will be $0.40-0.04 = 0.44$ kg pcd, and the amount of water introduced will be of $0.30-0.46=0.76$ kg pcd. Further, the heat developed by the combustion amounts to $0.44 \times 4000 - 0.76 \times 600 =$ some 1300 kcal pcd.

With the incineration process effected with combustion air approximately 75 percent in excess over the theoretical demand, the resulting volume of flue gas will be on the order of some 3.65 Nm³ pcd. to which $0.76:0.804=0.95$ Nm³ pcd of secondary water vapor from the sludge water and from the humidity from the refuse must be added, the total volume of flue gas being of some 4.60 Nm³ pcd. Under these conditions, a temperature of approximately 800°C. will result in the combustion chamber of the incinerator thus ensuring odorless operation and total incineration of the waste material.

The exhaust temperature of the flue gases being on the order of 300°C., the amount of heat available for useful purposes will be approximately 700 kcal pcd after deduction for the expected losses. Thus, the necessary heat for the thermal thickening of the sludge into slurry, that is the heat required to vaporize and superheat to 300°C. 50 percent of the sludge water $(0.46 \times 700 =$ some 325 kcal pcd) is easily provided.

The conditions described above are greatly improved through the utilization of an intermediate stage of mechanical dewatering of the sludge slurry. If, for example, by centrifugal separation, the water content is reduced to some 70 percent or by pressure filtration, to some 45 to 50 percent, the slurry is converted into cakes of semi-solid consistency which may be added to and mixed with the solid refuse and charged together into the incinerator for the solid refuse. In such instances, more favorable burning conditions will result in the combustion chamber of the incinerator for solid refuse where temperatures of 850 to 900°C. or even more may be attained, while sufficient excess heat is available for vaporizing and superheating to 300°C. the water separated in the intermediate mechanical dewatering process, i.e., some 0.27 kg pcd in the case of centrifuges, and some 0.38 kg pcd in the case of pressure filtration.

THE INVENTIVE APPARATUS

Attention is now directed to the appended single figure of the drawings which depicts a principal flow diagram helpful in obtaining a better understanding of the inventive process as well as its features and further advantages. The flow diagram also is deemed to be useful in presenting a representative mechanical arrangement for carrying out the inventive process.

Referring now to the diagram, an incinerator for solid refuse is designated by the reference O the refuse being charged into the incinerator at 1, while the non-combustible residues from the incineration itself are discharged at 2. Combustion gases leave the incinerator at 3 and are ducted or carried into the primary or heating side of a pressurized vaporizer 4. Such pressurized vaporizer may be a tubular heat recovery boiler for saturated steam located downstream of the combustion chamber of the incinerator and operating at a moderate pressure of not over 10 at$\mu$. The aqueous sewage sludge is fed into the vaporizer at 5 while the water vapor or steam resulting from the partial vaporization of the aqueous sewage sludge is collected and ducted at 6 to comingle with the exhaust flue gases at 12 thereby destroying any possible unpleasant odors.

The thickened slurry having approximately 85 percent water content is drained off at 7 either in a continuous or discontinuous manner and then is subsequently introduced in an atomized state into the combustion chamber of the incinerator as depicted by 8 or, alternatively, into an intermediate station 9 for mechanical dewatering, thereafter to be added to and blended with the solid refuse prior to its incineration as depicted at 10. The liquids separated during the intermediate dewatering are sprayed at 11 into the current of exhaust flue gas 12.

The component parts of the apparatus discussed above discussed as being suitable for carrying out the inventive process individually comprise elements that are known in and of themselves such as the incinerator for solid refuse O, the vaporizer 4 for the partial vaporization of the sludge water, the mechanical dewatering station 9 and the means for ducting the liquids, gases and vapor as shown in the principal flow diagram. Thus, a detailed description of each of these component elements is not deemed necessary for an understanding of the instant invention.

I claim:

1. A process for the concomitant incineration of solid refuse and aqueous sewage sludge such as from community treatment plants, said process comprising the steps of:

incinerating the solid refuse;

partially vaporizing the sludge water in a vaporizer by means of heat generated by the combustion of the solid refuse, the hot combustion gases effluent from the incineration of the solid sludge acting as intermediate agents and heat carriers, the vaporization being carried out at a predetermined pressure and temperature, whereby the sewage sludge is thermally thickened;

draining off the resultant thickened slurry from the pressurized vaporizer; and introducing the resultant thickened slurry into the combustion chamber of the incinerator for solid refuse.

2. A process as defined in claim 1 wherein the resultant thickened slurry is introduced into the combustion chamber of the incinerator in an atomized state.

3. A process as defined in claim 1, wherein said partial vaporization is carried out at a temperature at least equal to 150°C. whereby physical changes are effected in the structure of the solid organic matter in the sludge; said process further including the step of further dewatering the slurry subsequent to said partial vaporization and prior to the introduction of the slurry into the combustion chamber of the incinerator for solid refuse, the resulting semi-solid sludge being added to and mixed with the solid refuse to be incinerated together.

4. A process as defined in claim 3, further including the step of spraying the liquid separated during the further mechanical dewatering of the slurry into the combustion chamber of the incinerator for solid refuse.

5. An apparatus for the concomitant incineration of solid refuse and aqueous sewage sludge, said apparatus comprising an incinerator means for solid refuse; a pressurized vaporizer means for receiving the aqueous sewage sludge and for thickening the aqueous sewage sludge into slurry by partial vaporization of the sludge water; means comprising hot combustion gases effluent from said incinerator means for heating said vaporizer means; an intermediate station means for further mechanical dewatering of the slurry whereby the slurry is converted into a semi-solid matter; means for supplying combustion air to said incinerator means and for ducting the combustion gases to and from said vaporizer means; means for feeding the aqueous sludge into said vaporizer means and for draining off from said vaporizer means the resulting slurry; means for introducing said resulting slurry in an atomized state into the combustion chamber of said incinerator means; means for collecting the water vapor issuing from said vaporizer means and ducting said water vapor into the current of exhaust flue gases; means for leading the semi-solid sludge resulting from said intermediate station means for mechanical dewatering to be added to and mixed with the solid refuse prior to its incineration; and means for spraying the liquid separated in said intermediate station means for mechanical dewatering into the current of exhaust flue gases.